(12) United States Patent  
Soda

(10) Patent No.: US 8,593,607 B2  
(45) Date of Patent: Nov. 26, 2013

(54) LIQUID CRYSTAL DISPLAY ELEMENT

(75) Inventor: Yuji Soda, Arakawa-ku (JP)

(73) Assignee: Optrex Corporation, Tokyo (JP)

( * ) Notice: Subject to any disclaimer, the term of this patent is extended or adjusted under 35 U.S.C. 154(b) by 122 days.

(21) Appl. No.: 13/233,737

(22) Filed: Sep. 15, 2011

(65) Prior Publication Data

US 2012/0069284 A1   Mar. 22, 2012

(30) Foreign Application Priority Data

Sep. 17, 2010  (JP) .................................. 2010-209861

(51) Int. Cl.
*G02F 1/1343*     (2006.01)

(52) U.S. Cl.
USPC ............................ 349/142; 349/143; 349/130

(58) Field of Classification Search
USPC .......... 349/142, 143, 139, 130, 193, 197, 129
See application file for complete search history.

(56) References Cited

U.S. PATENT DOCUMENTS

| | | | |
|---|---|---|---|
| 7,408,606 B2* | 8/2008 | Shih | 349/129 |
| 7,468,770 B2* | 12/2008 | Okumura | 349/123 |
| 7,564,525 B2* | 7/2009 | Miyachi et al. | 349/129 |
| 2004/0165136 A1 | 8/2004 | Sugiyama et al. | |
| 2005/0219452 A1 | 10/2005 | Chen et al. | |
| 2008/0111963 A1 | 5/2008 | Wu et al. | |
| 2009/0086132 A1* | 4/2009 | Horii et al. | 349/103 |

FOREIGN PATENT DOCUMENTS

| | | |
|---|---|---|
| JP | 3367902 | 11/2002 |
| JP | 2003-207782 | 7/2003 |
| JP | 2006-11362 | 1/2006 |
| JP | 2008-164983 A | 7/2008 |
| JP | 2009-168924 A | 7/2009 |

OTHER PUBLICATIONS

Extended European Search Report issued on Dec. 6, 2011 in patent application No. 11007437.4.

* cited by examiner

*Primary Examiner* — Thoi Duong
(74) *Attorney, Agent, or Firm* — Oblon, Spivak, McClelland, Maier & Neustadt, L.L.P.

(57) ABSTRACT

The object is to make alignment of liquid crystals more uniform by reducing alignment disorder when a voltage is applied and to improve the display quality. A liquid crystal display element comprises a first electrode (122), a second electrode (141) opposed to the first electrode, and a liquid crystal layer provided between the first electrode and the second electrode and having alignment of liquid crystal in the voltage-off state being vertical alignment, wherein either one of the first electrode and the second electrode is provided with a plurality of regularly disposed L-shaped slits, and the L-shaped slits (21) are formed so that at least within an area where the first electrode and the second electrode overlap each other, the electrode provided with the slits, is divided into a plurality of rectangular sub-pixel electrodes each having connection portions at three corners for connection to adjacent sub-pixel electrodes.

10 Claims, 10 Drawing Sheets

| | Example 1 | Example 2 | Example 3 | Example 4 |
|---|---|---|---|---|
| Segment electrode side | L-shaped slits | L-shaped slits | L-shaped slits | L-shaped slits |
| Common electrode side | Circular slits formed | No circular slits formed | Circular slits formed | No circular slits formed |
| Positions of connection portions | At three corners | At three corners | At three corners | At three corners |
| Size of sub-pixel electrodes | 55×55 μm | 55×55 μm | 70×70 μm | 70×70 μm |
| Evaluation of liquid crystal alignment | Stable. Rotational orientation is obtainable to a nicety. | Stable. Rotational orientation is obtainable. | Stable. Rotational orientation is obtainable to a nicety. | Stable. Rotational orientation is obtainable to a nicety. |

(a)

| | Comparative Example 1 | Comparative Example 2 |
|---|---|---|
| Segment electrode side | I-shaped slits | I-shaped slits |
| Common electrode side | No circular slits formed | No circular slits formed |
| Positions of connection portions | At four corners | At four corners |
| Size of sub-pixel electrodes | 55×55 μm | 70×70 μm |
| Evaluation of liquid crystal alignment | Rotational orientation obtainable once, but the alignment tends to be gradually disordered. | Rotational orientation obtainable once, but the alignment tends to be gradually disordered. |

| | Example 5 | Example 6 | Example 7 |
|---|---|---|---|
| Segment electrode side | L-shaped slits | L-shaped slits | L-shaped slits |
| Common electrode side | No circular slits formed | No circular slits formed | Circular slits formed |
| Positions of connection portions | At three corners | At three corners | At three corners |
| Size of sub-pixel electrodes | 40×40 μm | 70×70 μm | 70×70 μm |
| Evaluation of liquid crystal alignment | Rotational orientation obtainable and stable. | Rotational orientation obtainable and stable. | Rotational orientation obtainable and stable. Better than in Example 6. |

(b)

| | Comparative Example 3 | Comparative Example 4 |
|---|---|---|
| Segment electrode side | I-shaped slits | I-shaped slits |
| Common electrode side | No circular slits formed | No circular slits formed |
| Positions of connection portions | At four corners | At four corners |
| Size of sub-pixel electrodes | 40×40 μm | 70×70 μm |
| Evaluation of liquid crystal alignment | Alignment being non-uniform and unstable. | Rotational orientation obtainable, but uniformity in sub-pixels is poor. |

LIQUID CRYSTAL DISPLAY ELEMENT

TECHNICAL FIELD

The present invention relates to a liquid crystal display element wherein the initial alignment of liquid crystals is in a vertical direction, particularly to a liquid crystal display element which is capable of reducing alignment disorder.

BACKGROUND ART

As a liquid crystal display element, there is a liquid crystal display element wherein alignment (initial alignment) of liquid crystal molecules in a liquid crystal layer is substantially vertical to the substrate surface when no voltage is applied. Such a liquid crystal display element is called a VA (vertical alignment) type liquid crystal display element. In the VA-type liquid crystal display element, liquid crystal having a negative dielectric anisotropy is used. And, by applying a voltage to the liquid crystal layer, liquid crystals (liquid crystal molecules) are orientated towards horizontal to the substrate surface (e.g. Patent Document 1). With the VA-type liquid crystal display element, it is possible to increase the responsivity and to realize a display with a high contrast, as compared with a TN (twisted nematic) type liquid crystal display element or a STN (super twisted nematic) type liquid crystal display element (e.g. Patent Document 2).

In a case where alignment of liquid crystals in the voltage-off state, is completely vertical to the substrate, it is not possible to prescribe the tilting direction of liquid crystals when a voltage is applied. Consequently, the alignment of liquid crystals tends to be non-uniform, and the display quality deteriorates. Therefore, it is necessary to prescribe the tilting direction of liquid crystals by imparting a pretilt by some methods or by adjusting the shapes of electrodes. The method for prescribing a tilting direction of liquid crystals by imparting a pretilt or by adjusting the shapes of electrodes, may, for example, be an oblique electric field method wherein the electric field direction by an applied voltage is made oblique to the substrate surface, a rib method wherein electrodes, etc. are provided with a rib structure, or an oblique vapor deposition method wherein silicon oxide ($SiO_2$) is obliquely vapor-deposited on a substrate. Further, it is also possible to prescribe the alignment direction of liquid crystals by applying rubbing treatment to a vertical alignment type alignment film.

Further, as a method for prescribing the alignment direction of liquid crystals, a method of forming slits in an electrode is known. For example, Patent Document 3 discloses a liquid crystal display device wherein a plurality of openings are regularly formed in an electrode to define sub-pixel regions by such openings, so that liquid crystal molecules in such sub-pixel regions are axially symmetrically aligned. In the liquid crystal display device disclosed in Patent Document 3, the sub-pixel regions are defined so that at least one of corners and sides of a polygonal shape have such openings. Further, domain division to let a plurality of alignment directions co-exist by a method of forming slits in an electrode has also been proposed.

PRIOR ART DOCUMENTS

Patent Documents

Patent Document 1: JP-A-2003-207782 (paragraphs 0002 to 0004)
Patent Document 2: JP-A-2006-11362 (paragraph 0014)
Patent Document 3: Japanese Patent No. 3,367,902

DISCLOSURE OF INVENTION

Technical Problem

However, the method of applying rubbing treatment has such problems that deterioration of the display quality or deterioration in yield due to rubbing, such as streaky display irregularities, is likely to result, and it tends to be difficult to increase viewing angle characteristics by domain division to let a plurality of alignment directions co-exist. Further, the rib method of forming a rib structure on e.g. electrodes has such a problem that the number of process steps is so large that the production costs are high.

The domain division by the method of forming slits in an electrode has had a problem that non-uniformity in the liquid crystal alignment state is substantial among the respective sub-pixels, and in the regions where alignment disorder has resulted, the tilting direction of liquid crystals is not uniform, whereby the transmittance tends to be non-uniform, and the contrast tends to be non-uniform, and as a result, the display quality tends to deteriorate.

Further, with respect to a liquid crystal display element having an electrode wherein I-shaped slits as disclosed in FIG. 5(c) in Patent Document 3 are disposed to surround the four sides of a sub-pixel region, the change in transmittance is calculated by simulation, whereby it is conceivable that as the area of a region (the connection region 90 in FIG. 17) for connection to an adjacent sub-pixel electrode becomes large, alignment disorder of liquid crystal molecules will be formed from such a region. That is, even if the alignment direction of liquid crystals can be once uniformly controlled, if the alignment stability in the connection region is poor, the alignment disorder of liquid crystals tends to gradually expand also to the sub-pixel region under such an influence.

Therefore, it is an object of the present invention to provide a VA-type liquid crystal display element which is capable of making alignment of liquid crystals more uniform by reducing alignment disorder when a voltage is applied and which is capable of improving the display quality.

Solution to Problem

The liquid crystal display element of the present invention comprises a first electrode disposed to display a prescribed display pattern in a display area, a second electrode opposed to the first electrode, and a liquid crystal layer provided between the first electrode and the second electrode and having alignment of liquid crystal in the voltage-off state being vertical alignment, wherein either one of the first electrode and the second electrode is provided with a plurality of regularly disposed L-shaped slits, and the L-shaped slits are formed so that at least within an area where the first electrode and the second electrode overlap each other, the electrode provided with the slits, is divided into a plurality of rectangular sub-pixel electrodes each having connection portions at three corners for connection to adjacent sub-pixel electrodes.

Further, the liquid crystal display element of the present invention may comprises a plurality of first electrodes disposed in a horizontal direction in a display area, a plurality of second electrodes disposed in a vertical direction in the display area to intersect with the first electrodes, and a liquid crystal layer provided between the first electrodes and the second electrodes and having alignment of liquid crystal in the voltage-off state being vertical alignment, wherein either one of the first electrodes and the second electrodes are provided with a plurality of regularly disposed L-shaped slits, and the L-shaped slits are formed so that at least within an area where the first electrodes and the second electrodes overlap each other, the electrodes provided with the slits, are each divided into a plurality of rectangular sub-pixel electrodes each having connection portions at three corners for connection to adjacent sub-pixel electrodes.

Further, in the liquid crystal display element, the first electrode may be a segment electrode, and the second electrode may be a common electrode, wherein the segment electrode is provided with the L-shaped slits.

Further, the electrode on the opposite side of the electrode provided with the L-shaped slits, may be provided with dot-shaped slits formed at positions corresponding to the center portions of the respective sub-pixel electrodes. Here, the dot-shaped means circular, oval or polygonal such as triangular or quadrangular.

Further, the diameter of the dot-shaped slits may be from 7 to 14 μm.

Further, the L-shaped slits may be formed so that the size of one side of each sub-pixel electrode is from 40 to 85 μm.

Further, the width of the L-shaped slits may be from 7 to 14 μm.

Further, the liquid crystal display element may be provided with a plurality of first electrodes, wherein the L-shaped slits are formed so that they take a uniform array throughout the entire display area.

Further, in the liquid crystal display element, of the first electrodes and the second electrodes, ones having a shorter electrode length may be provided with the L-shaped slits.

Advantageous Effects of Invention

According to the present invention, it is possible to make the alignment of liquid crystals more uniform by reducing alignment disorder at the time when a voltage is applied and to improve the display quality.

BRIEF DESCRIPTION OF DRAWINGS

FIG. 14 is diagrams showing the evaluation results in Examples 1 to 4 and in Comparative Examples 1 and 2.

FIG. 16 is diagrams showing the evaluation results in Examples 5 to 7 and in Comparative Examples 3 and 4.

DESCRIPTION OF EMBODIMENTS

Embodiment 1

Figure 1:
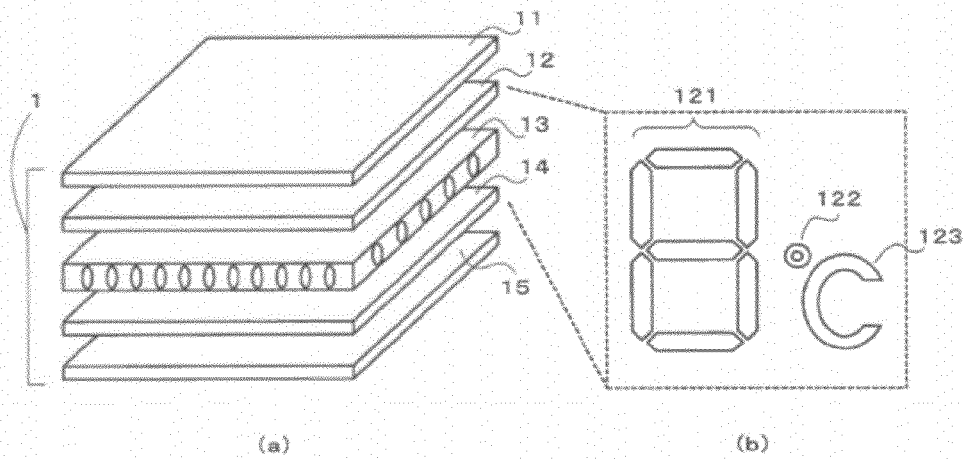
FIG. 1(*a*) is an exploded perspective view illustrating a construction example of a VA-type liquid crystal display element according to a first embodiment, and FIG. 1(*b*) is a plan view showing an example of segment electrodes according to the first embodiment.

Now, embodiments of the present invention will be described with reference to the drawings. FIG. 1(*a*) is an exploded perspective view illustrating a construction example of a VA-type liquid crystal display element 1 according to the first embodiment of the present invention. The liquid crystal display element 1 is formed between a pair of substrates (not shown) made of e.g. glass and has a construction wherein from a viewing side (front side), a front polarizer 11, a segment electrode member 12, a liquid crystal layer 13, a common electrode member 14 and a rear polarizer 15 are laminated. Hereinafter, the front polarizer 11 will be referred to as the F polarizer 11. Further, the rear polarizer 15 will be referred to as the R polarizer 15. In the liquid crystal display element 1, in the voltage-off state, liquid crystals in the liquid crystal layer 13 are vertically aligned. Further, the F polarizer 11 and the R polarizer 15 are disposed so that the absorption axes of the respective polarizers are mutually orthogonal to each other. Further, in FIG. 1(*a*), the substrates are omitted.

FIG. 1(*b*) is a plan view illustrating an example of the segment electrode member 12. In FIG. 1(*a*), the segment electrode member 12 is shown in a plate form, but more specifically, the segment electrode member 12 is constituted by at least one segment electrode to be formed to meet the shape of the display pattern. In the example shown in FIG. 1(*b*), as the segment electrode member 12 in the liquid crystal display element of segment type, three types of segment electrodes 121, 122 and 123 are shown. Further, although not shown, the segment electrode member 12 includes wirings for the respective segment electrodes. The liquid crystal display element 1 is a passive type liquid crystal display element not having an active element such as TFT (thin film transistor). Further, in a case where the liquid crystal display element 1 is applied to a transmission type liquid crystal display panel, a backlight will be installed, for example, on the rear side (back side) of the R polarizer 15.

Further, also the common electrode member 14 is shown in a plate form in FIG. 1(*a*), but more specifically, the common electrode member 14 is constituted by at least one common electrode opposed to the segment electrode. The common electrode is formed so that it overlaps with the segment electrode at least within an area for the display pattern.

Figure 2:
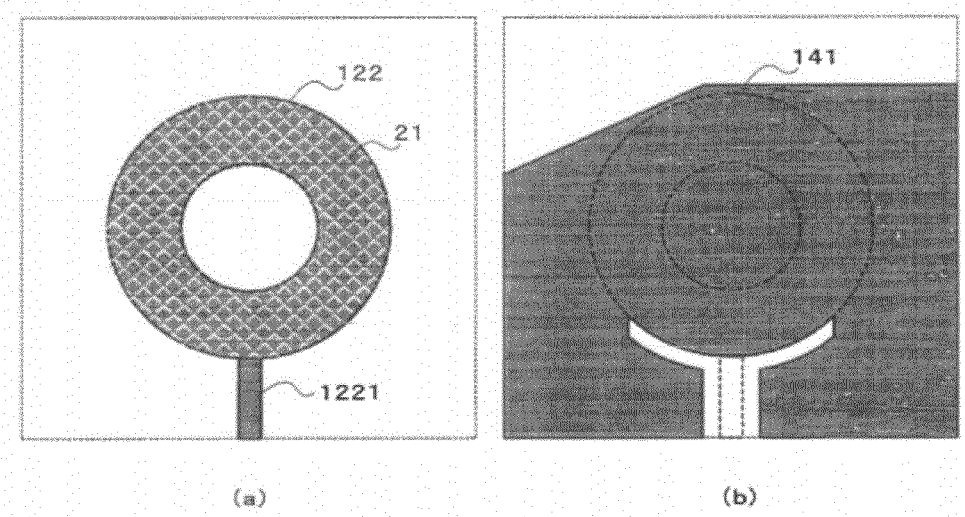
FIG. 2 is plan views showing shape examples of a segment electrode and a common electrode.

FIG. 2 is plan views showing shape examples of a segment electrode and a common electrode for the liquid crystal display element in this embodiment. Here, FIG. 2(a) shows a shape example of a segment electrode, and FIG. 2(b) shows a shape example of a common electrode. The example shown in FIG. 2 is an example of a pattern of the segment electrode 122 at a portion corresponding to "°" in the shape of "° C." among examples of segment electrodes shown in FIG. 1(b). Here, the electrode 1221 is a wiring for the segment electrode 122. Here, in order to avoid wiring disconnection by slits, no slits should better be formed in the wiring with a small line width.

In the case of a usual segment type liquid crystal display element, at least a segment electrode of a shape to meet the display pattern is provided. The segment electrode in this embodiment is of a shape to meet the display pattern, as shown in FIG. 2(a), but regularly disposed L-shaped slits 21 are formed inside thereof.

Figure 3:
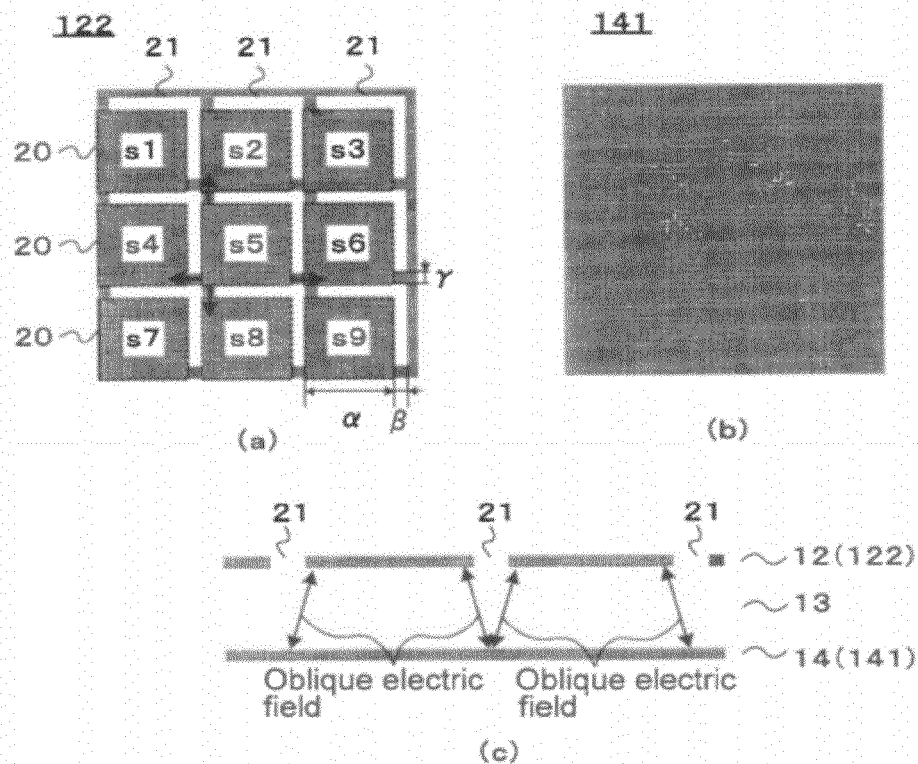
FIG. 3 is illustrative diagrams showing enlarged segment electrode and common electrode in an example wherein L-shaped slits are formed on the segment electrode side.

Further, FIG. 3 is illustrative diagrams showing, as enlarged, the segment electrode 122 and the common electrode 141 shown in FIG. 2. FIG. 3(a) is a plan view showing the segment electrode 122, and FIG. 3(b) is a plan view showing the common electrode 141. Further, FIG. 3(c) is a schematic cross-sectional view of the liquid crystal display element 1 in a state where the segment electrode 122 and the common electrode 141 are laminated. Here, in FIGS. 3(a) and (b), the L-shaped slits 21 are shown in such a state as rotated so that they are arrayed in right to left and up and down directions in the drawings to simplify the illustration.

As shown in FIG. 3(a), the segment electrode 122 is divided into a plurality of rectangular sub-pixel electrodes 20 by forming the L-shaped slits 21 in regular disposition. More specifically, it takes a structure wherein the following plurality of sub-pixel electrodes 20 are arrayed. Here, each sub-pixel electrode 20 is of a shape wherein one corner among four corners and two sides extending from that corner are defined by one L-shaped slit 21. Further, the remaining three corners of the sub-pixel electrode 20 are open, and via the open three corners, the pixel electrode is connected to adjacent four sub-pixel electrodes 20. Hereinafter, in the definition of the sub-pixel electrode 20, portions (electrodes) for connection to other sub-pixel electrodes 20, thus formed at three corners, will be referred to as connection portions 22.

Figure 4:
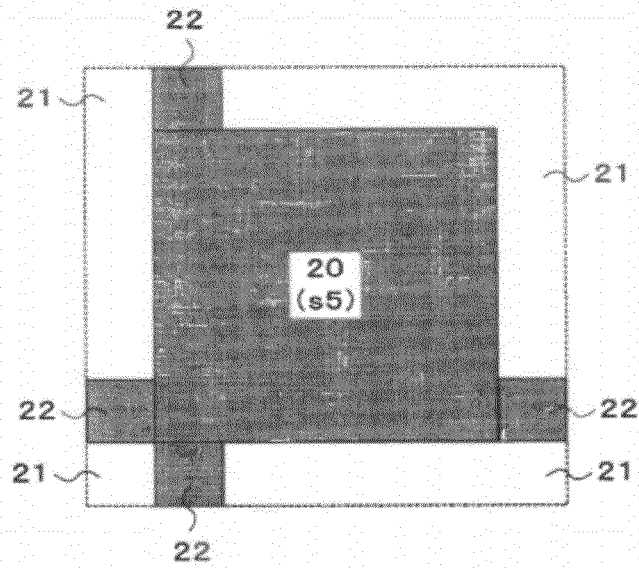
FIG. 4 is an illustrative diagram showing a sub-pixel electrode in the present invention.

For example, with respect to the sub-pixel electrode s5 in FIG. 3(a), the upper right corner and the upper side and right side extending from that corner are defined by an L-shaped slit (first slit). And, the left side is defined by an L-shaped slit (second slit) formed on the left side of the first slit, and the lower side is defined by an L-shaped slit (third slit) formed below the first slit. Further, the sub-pixel electrode s5 has, at an upper left corner (a region forming a rectangular one corner), a connection portion 22 for connection to the sub-pixel electrode s2 adjacent in the upper direction (see FIG. 4). Further, at the lower right corner, it has a connection portion 22 for connection to the sub-pixel electrode s6 adjacent in the right direction (see FIG. 4). Further, at the lower left corner, it has a connection portion 22 for connection to the sub-pixel electrode s8 adjacent in the lower direction and a connection portion 22 for connection to the sub-pixel electrode s4 adjacent in the left direction (see FIG. 4). Further, it takes a form such that it has two connection portions at a corner located on a diagonal line of the corner (in this Example, the upper right corner) defined by the L-shaped slit.

Further, the sub-pixel electrode 20 preferably has a size of one side (α in FIG. 3(a)) being from 40 to 85 μm. If the size of one side is less than 40 μm, the influence of the oblique electric field by slits tends to be too large, and the alignment state of liquid crystal tends to deteriorate. Further, by the influence of non-uniformity in the patterning state to form electrodes, it tends to be difficult to form a prescribed slit shape, whereby the alignment state of liquid crystal tends to be non-uniform. If it is made larger than 85 μm, the influence of the oblique electric field by slits tends to be small, whereby it tends to be difficult to obtain liquid crystal alignment to the centers of the sub-pixel electrodes, whereby the alignment state of liquid crystal tends to deteriorate. Further, if the size of the sub-pixel electrode is large, the display pattern tends to be rough. Further, the shape of the sub-pixel electrode 20 is preferably square. In other words, the L-shaped slit 21 preferably has an inner angle of 90°.

Further, the width of a slit (β in FIG. 3(a)) is preferably from 7 to 14 μm. If it is less than 7 μm, the influence of the oblique electric field by the slit tends to be small, whereby the alignment state of liquid crystal tends to deteriorate. On the other hand, if it exceeds 14 μm, a non-lighted portion increases by the slit, whereby the transmittance tends to deteriorate. Further, the width of the connection portion 22 (γ in FIG. 3(a)) should better be smaller within a range where an electrical connection can be secured between the sub-pixel electrodes. Further, it is preferably made to be a width substantially the same as the width of the slit. That is, it is preferably from 7 to 14 μm.

Further, the direction of slits is not particularly limited. For example, in a case where the display pattern is a shape to emphasize a straight line, slits 21 may be disposed so that sub-pixel electrodes 20 are arrayed along the vertical axis and the horizontal axis of the display pattern (e.g. the direction shown in FIG. 3(a)). Further, for example, in a case where the display pattern is a shape not to emphasize the straight line, for example, in a case where it is a curved shape, slits 21 may be disposed so that sub-pixel electrodes 20 are arrayed along axes which are, respectively, at 45° to the vertical axis and the horizontal axis of the display pattern (e.g. the direction shown in FIG. 2(a)).

Further, the common electrode 141 may be formed so that as shown in FIGS. 2(b) and FIG. 3(b), it overlaps with the segment electrode 122 at least in an area of the display pattern.

Thus, as regularly disposed L-shaped slits 21 are formed on the segment electrode side, it is possible to generate an oblique electric field at the electrode edge portions at the time when a voltage is applied, as shown in FIG. 3(c). In each sub-pixel electrode, it is possible to generate an oblique electric field to control a plurality of alignment directions, and as a result, domain division becomes possible.

Figure 5:
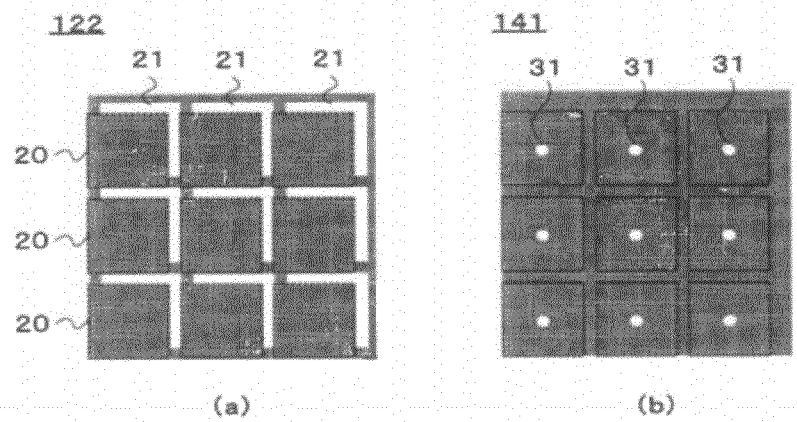
FIG. 5 is illustrative diagrams showing enlarged segment electrode and common electrode in an example wherein dot-shaped slits are formed on the common electrode side.

Further, FIG. 5 is illustrative diagrams showing an example wherein circular slits 31 are further formed on the common electrode side. Here, FIG. 5(a) is a plan view showing an example of a segment electrode 122 and is the same as the example shown in FIG. 3(a). FIG. 5(b) is a plan view showing another example of the common electrode 141 of this embodiment. As shown in FIG. 5(b), circular slits (holes) 31 may be formed on the common electrode side so that they are located at the centers of the sub-pixel electrodes 20. Here, in this embodiment, the slits are made to have a circular shape, but they may be rectangular or oval. That is, they may be dot-shaped with a small diameter.

By forming circular slits (holes) at positions corresponding to the center portions of the sub-pixel electrodes 20 on the common electrode side, it is possible to further stabilize the alignment state of liquid crystal and further to increase the response speed. The diameter of the circular slits is preferably from 7 to 14 μm. If it is less than 7 μm, the influence of the oblique electric field by slits tends to be small, whereby the effect to stabilize the alignment state of liquid crystal tends to be hardly obtainable. On the other hand, if it is made to exceed 14 μm, a non-lighted portion increases by slits, whereby the transmittance tends to deteriorate.

In the above description, taking the segment electrode 122 as an example, the method for forming L-shaped slits 21 and circular slits 31 to the opposite electrode (the shape, size, the alignment method, etc.) has been described, but formation of slits may be carried out in the same manner with respect to other segment electrodes.

Figure 6:
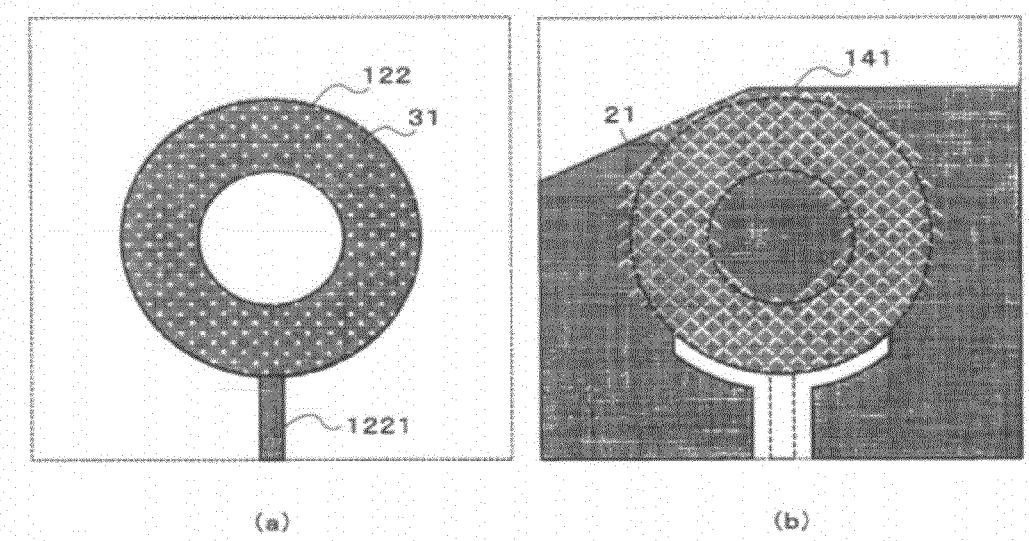
FIG. 6 is plan views showing shape examples of segment electrode and common electrode in an example wherein L-shaped slits are formed on the common electrode side.

In the foregoing description, an example is described wherein L-shaped slits are formed in the segment electrode side, and circular slits are formed on the common electrode side being the opposite electrode, but they may be reversed. For example, as shown in FIG. 6, L-shaped slits 21 may be formed in the common electrode 141, and circular slits 31 may be formed on the segment electrode 122 being the opposite electrode. Otherwise, without forming circular slits 31, L-shaped slits may be formed on the common electrode side only. In a case where L-shaped slits are formed on the common electrode side, it is advisable to form the L-shaped slits in a slightly larger region so that the disposition positions of the slits are included in the display pattern. Here, L-shaped slits may be formed in either one of the electrodes, and in the case of forming circular slits, such circular slits may be formed on the opposite electrode side. Further, it is usually advisable to form L-shaped slits on the segment electrode side having a smaller area, whereby an oblique electric field can effectively be generated.

Figure 7:
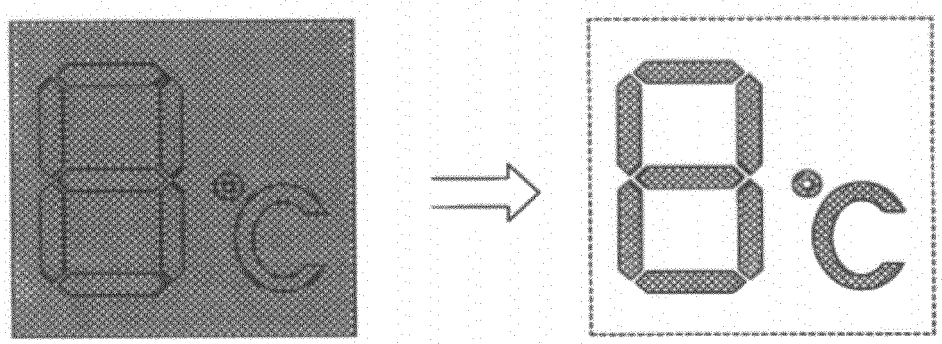
FIG. 7 is an illustrative diagram showing a method for regulating positions for location of slits.

Further, arrangement of L-shaped slits 21 or circular slits 31 may be determined independently for each segment electrode. However, it is preferred that as shown in FIG. 7, the arrangement is made to be uniform throughout the entire display area, so that the design of a photo plate can be quickly completed. In such a case, after determining arrangement of slits over the entire display area, slits may be remained at the respective segment electrode portions or at electrode portions in areas to constitute display patterns.

Further, by using a biaxial film or a C plate used as an optical compensation film for VA, the angle dependency of transmittance in the voltage-off state can be made good, and a wide viewing angle can further be obtained.

Embodiment 2

Figure 8:
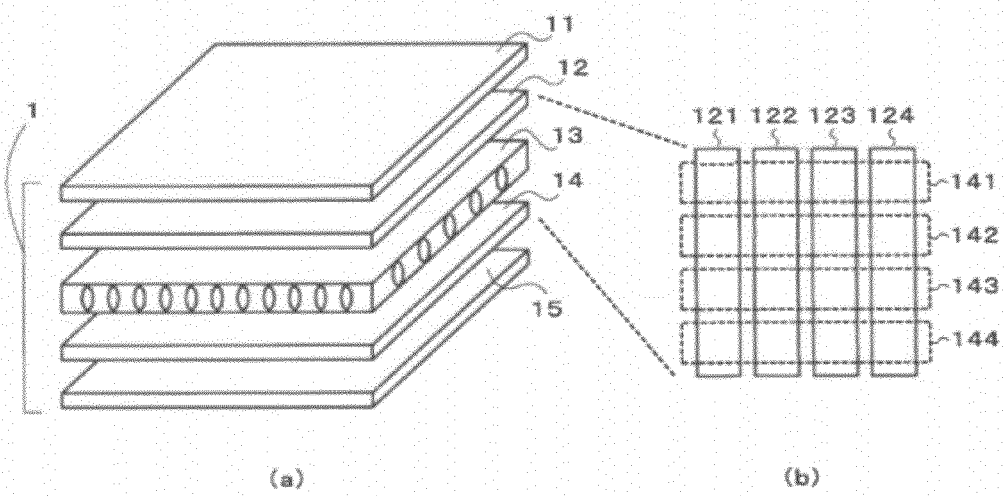
FIG. 8(*a*) is an exploded perspective view illustrating a construction example of a VA-type liquid crystal display element according to a second embodiment, and FIG. 8(*b*) is a plan view showing an example of segment electrodes and common electrodes according to a second embodiment.

Now, the second embodiment of the present invention will be described. This embodiment is an example wherein the present invention is applied to a VA-type liquid crystal display device of dot matrix type. FIG. 8(*a*) is an exploded perspective view showing a construction example of a VA-type liquid crystal element 1 according to the second embodiment, but basically the construction is the same as shown in FIG. 1(*a*). That is, the liquid crystal display element 1 is formed between a pair of substrates of e.g. glass and has a construction wherein from the viewing side, a F polarizer 11, a segment electrode member 12, a liquid crystal layer 13, a common electrode member 14 and a R polarizer 15 are laminated. Also in FIG. 8(*a*), the substrates are omitted.

FIG. 8(*b*) is a plan view showing examples of the segment electrode member 12 and the common electrode member 14 of this embodiment. In FIG. 8(*a*), the segment electrode member 12 is shown in a plate form, but more specifically, the segment electrode member 12 is constituted by a plurality of strip segment electrodes extending in a vertical direction. In the example shown in FIG. 8(*b*), parts of four segment electrodes 121 to 124 in the segment electrode member 12 are shown. In reality, the segment electrodes 121 to 124 further extend in the up and down direction in FIG. 8(*b*).

Further, in FIG. 8(*b*), the dashed lines represent the common electrode member 14 in the liquid crystal display element of this embodiment. In FIG. 8(*a*), the common electrode member 14 is shown in a plate form, but more specifically, the common electrode member 14 is constituted by a plurality of strip common electrodes extending in a horizontal direction. In FIG. 8(*b*), parts of four common electrodes 141 to 144 in the common electrode member 14 are shown. In reality, the common electrodes 141 to 144 further extend in the horizontal direction in FIG. 8(*b*). In this embodiment, the plurality of segment electrodes and the plurality of common electrodes are disposed to intersect with each other.

Figure 9:
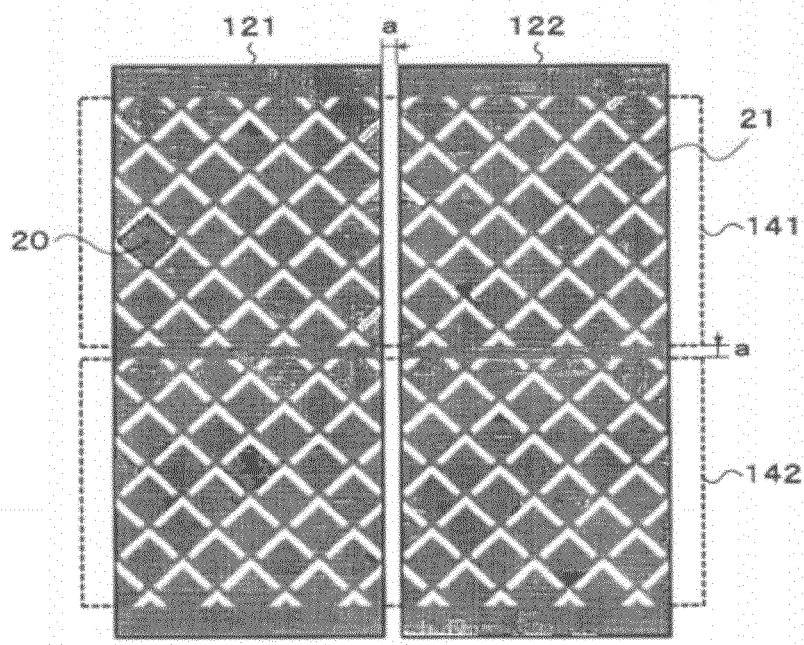
FIG. 9 is an illustrative diagram showing enlarged segment electrodes and common electrodes in an example wherein L-shaped slits are formed on the segment electrode side.

FIG. 9 is an illustrative diagram showing, as enlarged, parts of the segment electrodes 121 and 122 and the common electrodes 141 and 142 shown in FIG. 8(*b*). Here, the width of a space (gap) between the segment electrodes i.e. the distance between the electrodes, is "a". The distance between the electrodes may hereinafter be referred to simply as "the space". Further, the space between the common electrodes is the same as the space between the segment electrodes.

As shown in FIG. 9, the segment electrodes 121 and 122, L-shaped slits 21 are formed in a regular disposition at least in the respective pixel regions being regions where they intersect with the common electrodes, to present a structure wherein a plurality of rectangular sub-pixel electrodes 20 are arrayed.

The prescription of each sub-pixel electrode 20 is basically the same as in the first embodiment. That is, each sub-pixel electrode 20 has a shape wherein one corner among four and two sides extending from that corner are defined by one L-shaped slit 21. Further, it has a shape such that the remaining three corners of the sub-pixel electrode 20 are open, and via such open three corners, it is connected to adjacent four sub-pixel electrodes 20.

Also in this embodiment, the sub-pixel electrode 20 preferably has a size of one side being from 40 to 85 μm. If the size of one side is less than 40 μm, the influence of the oblique electric field by slits tends to be too large, and the alignment state of liquid crystal tends to deteriorate. Further, a prescribed slit shape tends to be hardly formed by an influence of the non-uniformity of the patterning state to form electrodes, whereby also the alignment state of liquid crystal tends to be non-uniform. If it exceeds 85 μm, the influence of the oblique electric field by slits tends to be small, whereby it tends to be difficult to obtain liquid crystal alignment to the centers of the sub-pixel electrodes, and the alignment state of liquid crystal tends to deteriorate. Further, the shape is preferably square. In other words, the inner angle of a L-shaped slit is preferably 90°.

Further, the width of each slit is preferably from 7 to 14 μm. If it is less than 7 μm, the influence of the oblique electric field by the slit tends to be small, whereby the alignment state of liquid crystal tends to deteriorate. On the other hand, if it exceeds 14 μm, a non-lighted portion increases by the slit, whereby the transmittance tends to decrease. Further, the width of the connection portion 22 should better be small within a range where electrical connection can be secured between sub-pixel electrodes. Further, it is preferably made to be the same width as the width of a slit. That is, it is preferably from 7 to 14 μm. Further, the direction of the slit is not particularly limited. Other points may be the same as in the first embodiment.

Figure 10:
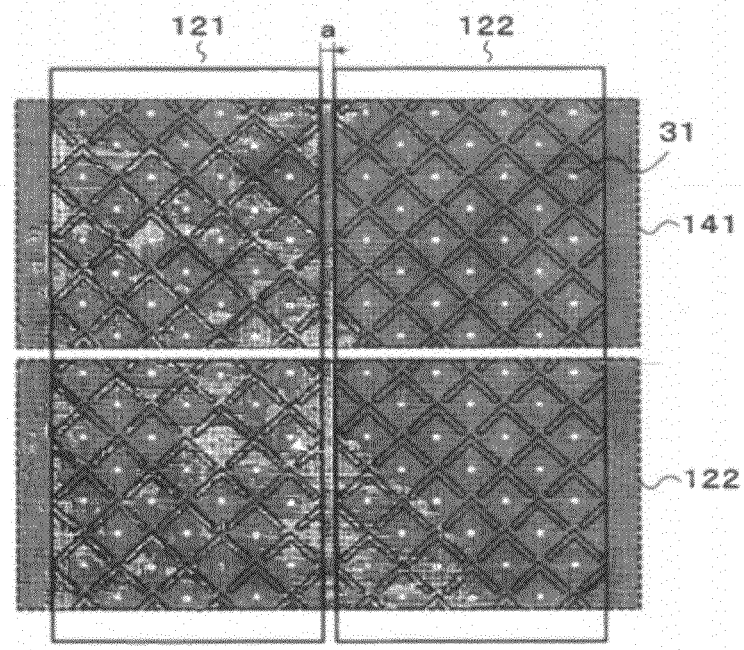
FIG. 10 is an illustrative diagram showing enlarged segment electrodes and common electrodes in an example wherein dot-shaped slits are formed on the common electrode side.

Further, FIG. 10 is an illustrative diagram showing an example wherein in this embodiment, circular slits 31 are further provided on the common electrode side. Also the circular slits (holes) 31 may basically be the same as in the first embodiment. That is, as shown in FIG. 10, the circular slits (holes) 31 may be formed in at least the respective pixel-regions of the common electrodes, at positions corresponding to the center portions of the respective sub-pixel electrodes 20 formed in the opposing segment electrodes.

Also in this embodiment, the diameter of a circular slit is preferably from 7 to 14 μm. If it is less than 7 μm, the influence of an oblique electric field by the slit tends to be small, and it becomes difficult to obtain an effect to stabilize the alignment state of liquid crystal. Further, if it exceeds 14 μm, a non-lighted portion increases by the slit, whereby the transmittance tends to deteriorate.

Further, also in this embodiment, L-shaped slits may be formed on the common electrode side, and circular slits may be formed on the segment electrode side being the opposite electrodes. Further, without forming circular slits 31, L-shaped slits may be formed only on the common electrode side. That is, L-shaped slits may be formed on either one of the electrode sides, and in the case of forming circular slits, they may be formed on the opposite electrode side. Further, usually, a segment electrode 121 formed to extend in the vertical direction to the longitudinal direction of a display panel is shorter in length of electrode as compared with a common electrode formed to extend in parallel with the longitudinal direction of the display panel, and therefore, it is preferred to form L-shaped slits on the segment electrode side. If L-shaped slits are formed on the common electrode side having a longer electrode length, the resistance tends to be large. Other points may be the same as in the first embodiment.

As described in the foregoing, according to this embodiment, even in a VA-type liquid crystal display element of dot-mask type, it is possible to make the alignment of liquid crystal more uniform by reducing alignment disorder at the time when a voltage is applied in the same manner as in the first embodiment, whereby it is possible to improve the display quality.

Example 1

Now, specific Examples will be described. Here, this Example (Example 1) and the following Examples 2 to 4 are examples corresponding to the first embodiment, and Examples 5 to 7 are examples corresponding to the second embodiment.

Figure 11:
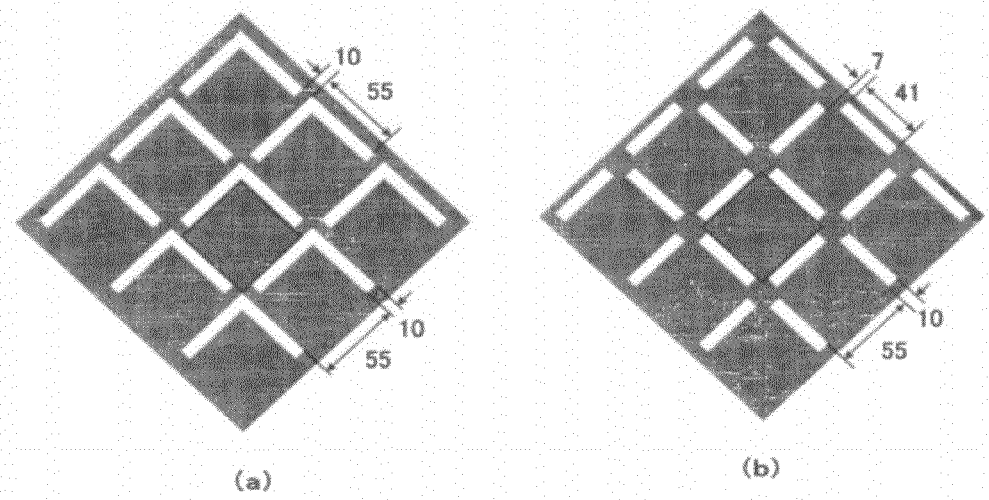
FIG. 11 is plan views showing the segment electrode in Example 1 and the segment electrode in Comparative Example 1 in comparison.

FIG. 11(a) is a plan view showing, as enlarged, a part of a segment electrode of Example 1. As shown in FIG. 11(a), in this Example, on a glass substrate on the F side (viewing side), a segment electrode to meet with the shape of a display pattern was subjected to patterning by forming L-shaped slits with a width of 10 μm regularly within its region thereby to form a plurality of sub-pixel electrodes of 55×55 μm. Each sub-pixel electrode 20 has such a shape that connection portions for connection to other sub-pixel electrodes, are formed at three corners.

Further, on a glass substrate on the R side (rear side), a common electrode to be opposed to the segment electrode, was formed by patterning. In this Example, circular slits 31 having a diameter of 10 μm were formed in the common electrode 14 at positions corresponding to the center portions of the respective sub-pixel electrodes formed in the opposing segment electrode 12.

Then, vertical alignment films were formed on the F side and the R side to bring the retardation Δn·d to be 469 nm. As the liquid crystal material, one having a dielectric anisotropy (Δ∈) of −4.4 was used.

As polarizers 11 and 15, SHC-13UL2SZ9 and SHC-13UL2S, manufactured by Polatechno Co., Ltd. were used.

When the longitudinal direction of the liquid crystal display panel is taken as a reference axis, and the counterclockwise angle from the reference axis to the absorption axis of the F polarizer 11 as observed from the viewing side is taken as $\theta_1$, $\theta_1$ was set to be 0°, and when the counterclockwise angle to the absorption axis of the R polarizer 15 is taken as $\theta_2$, $\theta_2$ was set to be 90°. Here, the absorption axes of the polarizers 11 and 15 were set to be orthogonal to each other, but, instead, polarizing axes may be made to be orthogonal to each other. Further, in a case where a good rotational orientation is obtainable, the absorption axes of the polarizers 11 and 15 may be set to be substantially orthogonal to each other, and, for example, a good visibility can be obtained even by setting $\theta_1=45°$, and $\theta_2=135°$.

The liquid crystal display element 1 prepared as described above, was driven at a duty ratio of 1/4, whereby a good visibility was obtained. That is, when no voltage was applied or in the power-off state, a good black display was obtained, and when a voltage was applied or in the power-on state, a bright white display was obtained.

Figure 12:
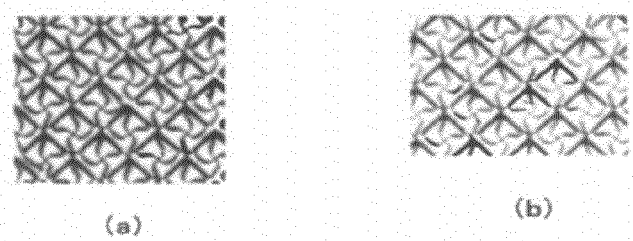
FIG. 12 is illustrative diagrams showing the evaluation results in Example 1.

FIGS. 12(a) and (b) are illustrative diagrams showing the results of polarizing microscopic observations of the display pattern areas in the power-on state in this Example. Here, in FIG. 12, from the display pattern area, two regions were cut out and shown. As shown in FIGS. 12(a) and (b), in this Example, it was confirmed that the aligned shapes and sizes of liquid crystals were uniform among the respective sub-pixel electrodes, and a stabilized rotational orientation was obtained in each sub-pixel electrode.

Comparative Example 1

FIG. 11(b) is a plan view showing, as enlarged, a part of the segment electrode in Comparative Example 1. As shown in FIG. 11(b), in this Comparative Example, on a glass substrate on the F side (viewing side), a segment electrode meeting the shape of a display pattern was subjected to patterning by forming I-shaped slits having a width of 10 μm regularly in its region to form a plurality of sub-pixel electrodes of 55×55 μm. Each sub-pixel electrode 20 has a shape wherein connection portions for connection to other sub-pixel electrodes were formed at four corners. Further, on the common electrode side, no circular slits were formed. Other points were the same as in Example 1.

Figure 13:
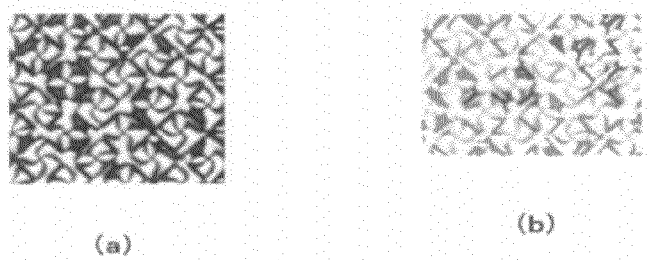
FIG. 13 is an illustrative diagram showing the evaluation results in Comparative Example 1.

The liquid display element 1 prepared as described above, was driven at a duty ratio of 1/4, whereby non-uniformity in brightness, etc. were observed in the power-on state (at the time when a voltage was applied), and it was found that the visibility was deteriorated as compared with the case of Example 1. FIGS. 13(a) and (b) are illustrative diagrams showing the results of polarizing microscopic observations of the display pattern area in the power-on state in this Comparative Example. Here, in FIG. 13, from the display pattern area, the same two regions as in FIG. 12 were cut out and shown. As shown in FIGS. 13(a) and (b), in this Comparative Example, although depending upon some sub-pixel electrodes, rotational orientation is observed, non-uniformity is confirmed in the alignment state of liquid crystals among the respective sub-pixel electrodes. This indicates that the tilting directions of liquid crystal molecules are not uniform when a voltage is applied. As a reason, it is considered that in the case of I-shaped slits, the areas (areas for connection) in which connection portions for connection to other sub-pixel electrodes are broad, and alignment stability at such portions is poor, which hinders alignment in the sub-pixel regions.

Whereas, in Example 1, by the L-shaped slit, it is possible to control the alignment in two directions at the center thereof (the region corresponding to the connection region in Comparative Example), and it is considered that by such a control, it was possible to stabilize the alignment at such a portion. It is considered that as a result, it was possible to obtain the stability of the liquid crystal alignment also in the sub-pixel regions. In the case of forming connection portions at corners in a rectangular sub-pixel region, the number of connection portions should better be small i.e. two rather than three, but it is not possible to regularly dispose a plurality of sub-pixel electrodes by two connection portions. Accordingly, the number of connection portions is three at the minimum, whereby the most preferred alignment state can be obtained.

Example 2

FIG. 14 is a diagram showing a summary of evaluation results in Examples 1 to 4 and Comparative Examples 1 and 2. In Example 2, under the same conditions as in Example 1, L-shaped slits were formed in a segment electrode to form sub-pixel electrodes having a size of 55×55 µm, and no circular slits were formed on the common electrode side, and in such a form, the performance was confirmed. Also in this Example, a good visibility was obtained. Further, with respect to the display pattern area in the power-on state in this Example, observation by a polarizing microscope was carried out, whereby it was confirmed that the aligned shapes and sizes of liquid crystals were uniform among the respective sub-pixel electrodes, and it was possible to obtain a stabilized rotational orientation in each sub-pixel electrode (FIG. 14).

Example 3

In Example 3, under the same conditions as in Example 1, L-shaped slits were formed in a segment electrode to form sub-pixel electrodes having a size of 70×70 µm, and circular slits were formed on the common electrode side, and in such a form, the performance was confirmed. Also in this Example, a good visibility was obtained. Further, with respect to the display pattern area in the power-on state in this Example, observation by a polarizing microscope was carried out, whereby it was confirmed that the aligned shapes and sizes of liquid crystals were uniform among the respective sub-pixel electrodes, and it was possible to obtain a stabilized rotational orientation in each sub-pixel electrode (FIG. 14).

Example 4

In Example 4, under the same conditions as in Example 1, L-shaped slits were formed in a segment electrode to form sub-pixel electrodes having a size of 70×70 µm, and no circular slits were formed on the common electrode side, and in such a form, the performance was confirmed. Also in this Example, a good visibility was obtained. Further, with respect to the display pattern area in the power-on state in this Example, observation by a polarizing microscope was carried out, whereby it was confirmed that the aligned shapes and sizes of liquid crystals were uniform among the respective sub-pixel electrodes, and it was possible to obtain a stabilized rotational orientation in each sub-pixel electrode (FIG. 14).

Comparative Example 2

In Comparative Example 2, under the same conditions as in Comparative Example 1, I-shaped slits were formed in the segment electrode to form sub-pixel electrodes having a size of 70×70 µm, and no circular slits were formed on the common electrode side, and in such a form, the performance was confirmed. As a result, it was observed that as compared with Example 4, the visibility was low. Further, as shown in FIG. 14, as a result of observation by a polarizing microscope, it was confirmed that in this Comparative Example, the alignment was gradually disordered, although rotational orientation was once obtained.

When each Example wherein L-shaped slits were formed in accordance with the first embodiment is compared with each Comparative Example wherein I-shaped slits were formed, in the same manner as in the foregoing, it was found that irrespective of the presence or absence of circular slits, or the size of sub-pixel electrodes, a good visibility is obtainable in the case of forming L-shaped slits. Especially, in the case where circular slits were provided, a very good alignment state was observed, and a wide viewing angle was obtained with little non-uniformity in brightness at lighted portions. Further, it was found that when circular slits were formed, the response speed increased by about 10%. Further, it was found that a good rotational orientation was obtainable as the size of sub-pixel electrodes became large, but a problem was confirmed such that if one side exceeded 85 µm, the display pattern looked rough.

Example 5

Figure 15:
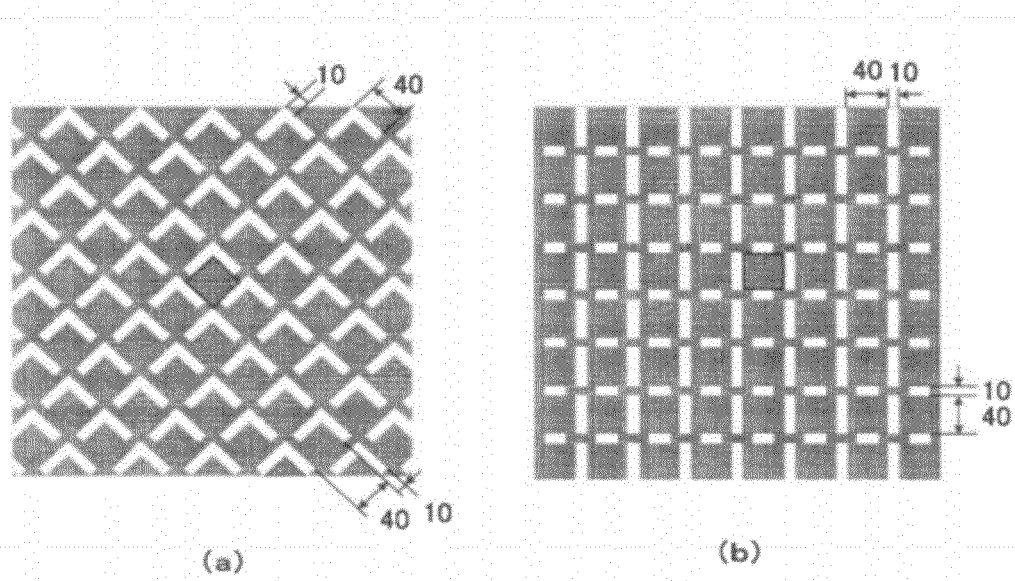
FIG. 15 is plan views showing the segment electrode in Example 5 and the segment electrode in Comparative Example 3 in comparison.
Figure 17:
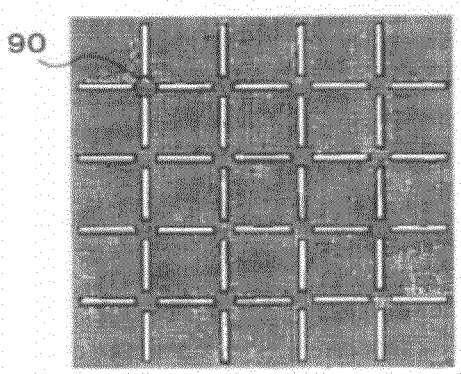
FIG. 17 is a plan view showing an electrode wherein slits are formed for domain division (conventional).

Now, Examples corresponding to the second embodiment will be described. FIG. 15(a) is a plan view showing, as enlarged, a part of a segment electrode in Example 5. In this Example, as shown in FIG. 15(a), on a glass substrate on the F side (viewing side), a plurality of strip segment electrodes extending in a vertical direction were subjected to patterning by forming L-shaped slits having a width of 10 µm regularly at least in the respective pixel regions to form a plurality of sub-pixel electrodes of 40×40 µm. Each sub-pixel electrode 20 has a shape wherein connection portions for connection to other sub-pixel electrodes are formed at three corners.

Further, on a glass substrate on the R side (rear side), a plurality of strip common electrodes which are orthogonal to the segment electrodes were formed by patterning. Here, no circular slits 31 were formed in the common electrodes. Further, the respective segment electrodes and the respective common electrodes had a line width of 390 µm and a space of 20 µm.

Then, vertical alignment films were formed on the F side and the R side to bring the retardation Δn·d to be 810 nm. As the liquid crystal material, one having a dielectric anisotropy (Δ∈) of −2.7 was used.

As polarizers 11 and 15, SHC-13UL2SZ9 and SHC-13UL2S, manufactured by Polatechno Co., Ltd. were used.

When the longitudinal direction of the liquid crystal display panel is taken as a reference axis, and the counter-clockwise angle from the reference axis to the absorption axis of the F polarizer 11 as observed from the viewing side is taken as $\theta_1$, $\theta_1$ was set to be 0°, and when the counter-clockwise angle to the absorption axis of the R polarizer 15 is taken as $\theta_2$, $\theta_2$ was set to be 90°. Here, the absorption axes of the polarizers 11 and 15 were set to be orthogonal to each other, but, instead, polarizing axes may be made to be orthogonal to each other. Further, in a case where a good rotational orientation is obtainable, the absorption axes of the polarizers 11 and 15 may be set to be substantially orthogonal to each other, and, for example, a good visibility can be obtained even by setting $\theta_1=45°$, and $\theta_2=135°$.

The liquid crystal display element 1 prepared as described above was driven at a duty ratio of 1/16, whereby a good visibility was obtained. That is, when no voltage was applied or in the power-off state, a good black display was obtained, and when a voltage was applied in the power-on state, a bright white display was obtained.

FIG. 16 is a diagram showing a summary of the evaluation results in Examples 5 to 7 and Comparative Example 3 and 4. With respect to the display pattern area in the power-on state in this Example, observation by a polarizing microscope was carried out, whereby it was found that the aligned shapes and sizes of liquid crystals were uniform among the respective sub-pixel electrodes, and it was possible to obtain a stabilized rotational orientation in each sub-pixel electrode (FIG. 16).

Comparative Example 3

FIG. 15(b) is a plan view showing, as enlarged, a part of a segment electrode in Comparative Example 3. As shown in FIG. 15(b), in this Comparative Example, on a glass substrate on the F side (viewing side), a plurality of strip segment electrodes extending in the vertical direction were subjected to patterning by forming I-shaped slits having a width of 10 µm regularly at least in the respective pixel regions to form a plurality of sub-pixel electrodes of 40×40 µm. Each sub-pixel electrode 20 has a shape wherein connection portions for connection to other sub-pixel electrodes are formed at four corners.

Further, on a glass substrate on the R side (rear side), a plurality of stripe common electrodes to be orthogonal to the segment electrodes were formed by patterning. Here, no circular slits 31 were formed in the common electrodes. Further, the respective segment electrodes and the respective common electrodes had a line width of 390 µm and a space of 20 µm.

Further, when the longitudinal direction of the liquid crystal display panel is taken as a reference axis, and the counterclockwise angle from the reference axis to the absorption axis of the F polarizer 11 as observed from the viewing side is taken as $\theta_1$, $\theta_1$ was set to be 45°, and when the counterclockwise angle to the absorption axis of the R polarizer 15 is taken as $\theta_2$, $\theta_2$ was set to be 135°. Other points were the same as in Example 1.

The liquid crystal display element 1 prepared as described above was driven at a duty ratio of 1/16, whereby non-uniformity in brightness, etc. were observed in a power-on state (when a voltage was applied) and it was found that the visibility was low as compared in the case of Example 1. Further, as shown in FIG. 16, as a result of observation by a polarizing microscope, it was confirmed that the alignment was non-uniform among the respective sub-pixel electrodes and was in an unstable state.

Example 6

In Example 6, under the same conditions as in Example 5, in the segment electrodes, L-shaped slits were formed to form sub-pixel electrodes having a size of 70×70 µm, and no circular slits were formed on the common electrode side, and in such a form, the performance was confirmed. Also in this Example, a good visibility was obtained. Further, with respect to the display pattern area in the power-on state in this Example, observation by a polarizing microscope was carried out, whereby it was confirmed that the aligned shapes and sizes of liquid crystals were uniform among the respective sub-pixel electrodes, and it was possible to obtain a stabilized rotational orientation in each sub-pixel electrode (FIG. 16).

Comparative Example 4

In Comparative Example 4, under the same conditions as in Comparative Example 3, in the segment electrodes, I-shaped slits were formed to form sub-pixel electrodes having a size of 70×70 µm, and no circular slits were formed on the common electrode side, and in such a form, the performance was confirmed. As a result, it was observed that the visibility was low as compared in Example 6. Further, as shown in FIG. 16, as a result of observation by a polarizing microscope, in this Comparative Example, it was confirmed that although a rotational orientation was obtainable, non-uniformity was observed in the alignment state in each sub-pixel electrode.

Example 7

In Example 7, under the same conditions as in Example 5, in the segment electrodes, L-shaped slits were formed to form sub-pixel electrodes having a size of 70×70 µm, and circular slits were formed on the common electrode side, and in such a form, the performance was confirmed. Also in this Example, a good visibility was obtained. Further, with respect to the display pattern area in the power-on state in this Example, observation by a polarizing microscope was carried out, whereby it was found that the aligned shapes and sizes of liquid crystals were uniform among the respective sub-pixel electrodes, and it was possible to obtain a stabilized rotational orientation in each sub-pixel electrode (FIG. 16).

As described in the foregoing, when each Example corresponding to the second embodiment wherein L-shaped slits were formed, and each Comparative Example wherein I-shaped slits were formed, are compared, it was found that in the Comparative Example, the liquid crystal alignment state was poor, and non-uniformity in the alignment state of liquid crystals was substantial among the respective sub-pixel electrode. Further, it was found that when circular slits were formed, the response speed increased by about 10%.

INDUSTRIAL APPLICABILITY

The present invention is applicable to improve the display quality in a VA-type liquid crystal display element. Further, the present invention is applicable also to an active matrix-type liquid crystal display element.

The entire disclosure of Japanese Patent Application No. 2010-209861 filed on Sep. 17, 2010 including specification, claims, drawings and summary is incorporated herein by reference in its entirety.

REFERENCE SYMBOLS

1: Liquid crystal display element
11: F polarizer
12: Segment electrode member
13: Liquid crystal layer
14: Common electrode member
15: R polarizer
121, 122, 123, 124: Segment electrodes
141, 142, 143, 144: Common electrodes
20: Sub-pixel electrode
21: Slit (L-shaped)
22: Connection portion
31: Slit (circular)

What is claimed is:
1. A liquid crystal display element comprising:
a segment electrode disposed to display a prescribed display pattern in a display area;
a common electrode opposed to the segment electrode; and a liquid crystal layer provided between the segment electrode and the common electrode and having alignment of liquid crystal in the voltage-off state being vertical alignment, wherein the segment electrode is provided with a plurality of regularly disposed L-shaped slits, and the L-shaped slits are formed so that at least within an area where the segment electrode and the common electrode overlap each other, the segment electrode provided with the slits, is divided into a plurality of rectangular sub-pixel electrodes each having connection portions at three corners for connection to adjacent sub-pixel electrodes, and the common electrode is provided with dot-shaped slits formed at positions corresponding to the center portions of the respective sub-pixel electrodes, and the segment electrode is provided closer to a viewing side of the liquid crystal display element than the common electrode.

2. The liquid crystal display element according to claim 1, wherein the dot-shaped slits have a diameter of from 7 to 14 μm.

3. The liquid crystal display element according to claim 1, wherein the L-shaped slits are formed so that the size of one side of each sub-pixel electrode is from 40 to 85 μm.

4. The liquid crystal display element according to claim 1, wherein the L-shaped slits have a width of from 7 to 14 μm.

5. The liquid crystal display element according to claim 1, which is provided with a plurality of segment electrodes, wherein the L-shaped slits are formed so that they take a uniform array throughout the entire display area.

6. A liquid crystal display element comprising:
a plurality of segment electrodes disposed in a horizontal direction in a display area;
a plurality of common electrodes disposed in a vertical direction in the display area to intersect with the segment electrodes; and
a liquid crystal layer provided between the segment electrodes and the common electrodes and having alignment of liquid crystal in the voltage-off state being vertical alignment, wherein the segment electrodes are provided with a plurality of regularly disposed L-shaped slits, and the L-shaped slits are formed so that at least within an area where the segment electrodes and the common electrodes overlap each other, the segment electrodes provided with the slits, are each divided into a plurality of rectangular sub-pixel electrodes each having connection portions at three corners for connection to adjacent sub-pixel electrodes, and the common electrodes are provided with dot-shaped slits formed at positions corresponding to the center portions of the respective sub-pixel electrodes, and the segment electrodes are provided closer to a viewing side of the liquid crystal display element than the common electrodes.

7. The liquid crystal display element according to claim 6, wherein the dot-shaped slits have a diameter of from 7 to 14 μm.

8. The liquid crystal display element according to claim 6, wherein the L-shaped slits are formed so that the size of one side of each sub-pixel electrode is from 40 to 85 μm.

9. The liquid crystal display element according to claim 6, wherein the L-shaped slits have a width of from 7 to 14 μm.

10. A liquid crystal display element comprising:
a plurality of first electrodes disposed in a horizontal direction in a display area;
a plurality of second electrodes disposed in a vertical direction in the display area to intersect with the first electrodes; and
a liquid crystal layer provided between the first electrodes and the second electrodes and having alignment of liquid crystal in the voltage-off state being vertical alignment, wherein either one of the first electrodes and the second electrodes are provided with a plurality of regularly disposed L-shaped slits, and the L-shaped slits are formed so that at least within an area where the first electrodes and the second electrodes overlap each other, the electrodes provided with the slits, are each divided into a plurality of rectangular sub-pixel electrodes each having connection portions at three corners for connection to adjacent sub-pixel electrodes, wherein of the first electrodes and the second electrodes, ones having a shorter electrode length are provided with the L-shaped slits.

* * * * *